United States Patent
Lee

(10) Patent No.: US 7,181,520 B2
(45) Date of Patent: Feb. 20, 2007

(54) METHOD FOR FILTERING INTERNET PROTOCOL PACKET IN CUSTOMER PREMISE EQUIPMENT FOR DIGITAL SUBSCRIBER LINES

(75) Inventor: Bo-Gu Lee, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 761 days.

(21) Appl. No.: 10/192,522

(22) Filed: Jul. 11, 2002

(65) Prior Publication Data

US 2003/0055993 A1 Mar. 20, 2003

(30) Foreign Application Priority Data

Aug. 29, 2001 (KR) ............... 2001-52316

(51) Int. Cl.
*G06F 15/173* (2006.01)
(52) U.S. Cl. .......... 709/224; 709/223; 709/225; 709/226; 709/227; 709/228; 709/230; 709/235; 713/153; 713/154; 370/254; 370/255; 370/389; 370/474
(58) Field of Classification Search ........ 709/223, 709/227, 230, 235; 713/153; 370/466, 474, 370/389, 254, 255
See application file for complete search history.

(56) References Cited

U.S. PATENT DOCUMENTS 5,204,858 A    4/1993  Kinashi et al.
6,092,110 A    7/2000  Maria et al.
6,108,782 A *  8/2000  Fletcher et al. ............. 713/153
6,577,642 B1 * 6/2003  Fijolek et al. ............. 370/465
6,584,074 B1 * 6/2003  Vasamsetti et al. ......... 370/254
2002/0023152 A1 * 2/2002  Oguchi ....................... 709/223

OTHER PUBLICATIONS

Chinese Office Action No. 02127593.3, issued Jan. 7, 2005, citing U.S. Patent No. 5,204,858 and U.S. Patent No. 6,092,110.

* cited by examiner

*Primary Examiner*—Yves Dalencourt
(74) *Attorney, Agent, or Firm*—Robert E. Bushnell, Esq.

(57) ABSTRACT

The present invention includes a method for preventing any external intruder by filtering an Internet Protocol packet in customer premise equipment connected between a personal computer (PC) and a digital subscriber line (xDSL) when it is operated in a bridge mode. To this end, the present invention provides the method including the steps of: detecting a destination IP address by analyzing the IP packet to be transmitted to the other party as a PC user access to an Internet through xDSL; registering the destination IP address to a predetermined allowance table; detecting a source IP address of the IP packet upon receiving the IP packet through xDSL; and checking whether the source IP address is duly registered to the allowance table for passing the corresponding IP packet through the PC only if the source IP address has been registered, and for blocking the corresponding IP packet if the source IP address has not been registered.

28 Claims, 7 Drawing Sheets

METHOD FOR FILTERING INTERNET PROTOCOL PACKET IN CUSTOMER PREMISE EQUIPMENT FOR DIGITAL SUBSCRIBER LINES

CLAIM OF PRIORITY

This application makes reference to, incorporates the same herein, and claims all benefits accruing under 35 U.S.C. §119 from my application entitled METHOD FOR FILTERING INTERNET PROTOCOL PACKET IN CUSTOMER PREMISE EQUIPMENT OF DIGITAL SUBSCRIBER LINE filed with the Korean Industrial Property Office on 29 Aug. 2001 and there duly assigned Serial No. 52316/2001.

BACKGROUND OF THE INVENTION

1. Field of the Invention

The present invention relates to Customer Premise Equipments (i.e., "CPE") connected between a personal computer (i.e., "PC") and a Digital Subscriber Line (i.e., "DSL"), and more particular, to a method for filtering Internet Protocol (i.e., "IP") packet in customer premise equipments for digital subscriber lines.

2. Description of the Related Art

In general, DSL, also known as "xDSL", is a high-speed modem technique that has been continuously developed to meet the increasing demands of large-scale marketing businesses of super fast Internet connection. In other words, the DSL is a public data network service for supporting bandwidth within a limited distance, using previous twisted pair wires. The xDSL is a generic name of a variety of DSL services, such as Asymmetric Digital Subscriber Line (i.e., "ADSL"), High-bit-rate Digital Subscriber Line (i.e., "HDSL"), Single-line Digital Subscriber Line (i.e., "SDSL"), Single-Pair High_Speed Digital Subscriber Line (i.e., "SHDSL"), Universal Digital Subscriber Line (i.e., "UDSL"), or Very-high-data-rate Digital Subscriber Line (i.e., "VDSL"). An ADSL system as an exemplary xDSL in the related art includes an ADSL Transceiver Unit-Central (i.e., "ATU-C") positioned at a cental office, and ADSL Transceiver Unit-Remote (i.e., "ATU-R") that corresponds to the customer premise equipment (i.e., "CPE") positioned at a subscriber's area are connected to each other through ADSL using the traditional twisted pair wire. The ATU-R is then connected to personal computer (i.e., "PC") through Ethernet link. Finally, the PC user is connected to a network like an Internet through ATU-R via ADSL and ATU-C.

On the other hand, the ATU-R can be operated in either an IP routed mode or a bridge mode, but in most of the cases, the bridge mode is used. Previously, the ATU-R was used for analyzing an IP packet transceived from the PC in the routed mode only, and for controlling the IP packet in accordance with a filtering rule. That is to say, the ATU-R could operate IP packet filtering in the IP routed mode only, so if there were an external intruder like a hacker in the bridge mode, the ATU-R could not perform either monitoring or controlling on the intruder.

As explained before, the major problem of the ATU-R, one of the CPE, is that since it can perform the IP packet filtering in the IP routed mode only, not being able to monitor or control the external intruder in the bridge mode, the IP assigned to the CPE in the bridge mode, if exposed to the outside, becomes totally open to the external intruder, with no defense.

SUMMARY OF THE INVENTION

It is, therefore, an object of the present invention to provide a method for filtering an Internet Protocol packet in customer premise equipment particularly being operated in a bridge mode, thereby preventing any external intrusion.

It is another object to provide a user the ability to select the method of filtering an Internet Protocol packet and when to filter the Internet Protocol packet.

It is yet another object to provide an alarm when the Internet Protocol packet that has not been registered in a table is received.

To achieve the above and other objects, a preferred embodiment of the present invention provides a method for filtering the Internet Protocol packet in customer premise equipment, the method including a series of the steps of: detecting a destination Internet Protocol (i.e., "IP") address by analyzing the IP packet to be transmitted to the other party according to the Internet access of a personal computer (i.e., "PC") through xDSL; registering the destination IP address to a predetermined allowance table; detecting a source IP address of the IP packet upon receiving the IP packet through xDSL; and checking whether the source IP address is duly registered to the allowance table for passing the corresponding IP packet through the PC only if the source IP address has been registered, and for blocking the corresponding IP packet if the source IP address has not been registered.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
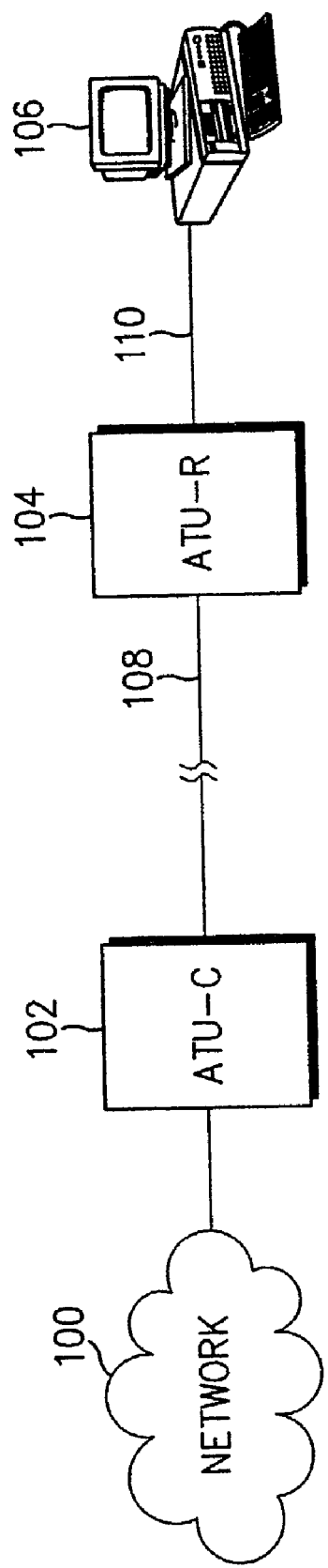
FIG. 1 is a schematic diagram showing an Asymmetric Digital Subscriber Line (i.e., "ADSL") of the earlier art.

Turning now to the drawings, FIG. 1 is a schematic diagram of an ADSL system as an exemplary xDSL. With reference to FIG. 1, an ADSL Transceiver Unit-Central (ATU-C) 102 positioned at a central office, and ADSL Transceiver Unit-Remote (ATU-R) 104 that corresponds to the customer premise equipment (CPE) positioned at a subscriber's area are connected to each other through ADSL 108 using the traditional twisted pair wire. The ATU-R 104 is then connected to a PC 106 through an Ethernet link 110. Finally, the PC 106 user is connected to a network 100 like an Internet through ATU-R 104 via ADSL 108 and ATU-C 102.

On the other hand, the ATU-R 104 can be operated in either an IP routed mode or a bridge mode, but in most of the cases, the bridge mode is used. Previously, the ATU-R was used for analyzing an IP packet transceived from the PC in the routed mode only, and for controlling the IP packet in accordance with a filtering rule. That is to say, the ATU-R could operate IP packet filtering in the IP routed mode only, so if there were an external intruder like a hacker in the bridge mode, the ATU-R could not perform either monitoring or controlling on the intruder.

A preferred embodiment of the present invention will now be described with reference to the accompanying drawings. In the following description, same drawing reference numerals are used for the same elements even in different drawings. The matters defined in the description are only provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
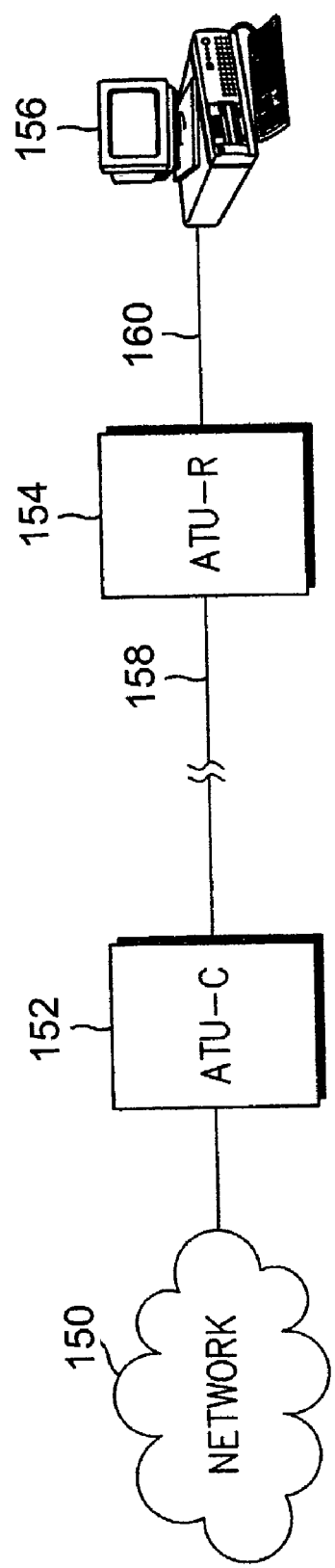
FIG. 2 is a schematic diagram showing an Asymmetric Digital Subscriber Line (i.e., "ADSL") system in accordance with the present invention.

FIG. 2 is a schematic diagram of an ADSL system as an exemplary xDSL system of the present invention. With reference to FIG. 2, an ADSL Transceiver Unit-Central (ATU-C) 152 positioned at a central office, and ADSL Transceiver Unit-Remote (ATU-R) 154 that corresponds to the customer premise equipment (CPE) positioned at a subscriber's area are connected to each other through ADSL 158 using the traditional twisted pair wire. The ATU-R 154 is then connected to a PC 156 through an Ethernet link 160. Finally, the PC 156 user is connected to a network 150 like an Internet through ATU-R 154 via ADSL 158 and ATU-C 152.

The preferred embodiment of the present invention is particularly embodied with an Asymmetric Digital Subscriber Line (ADSL), an exemplary of xDSL.

Figure 3:
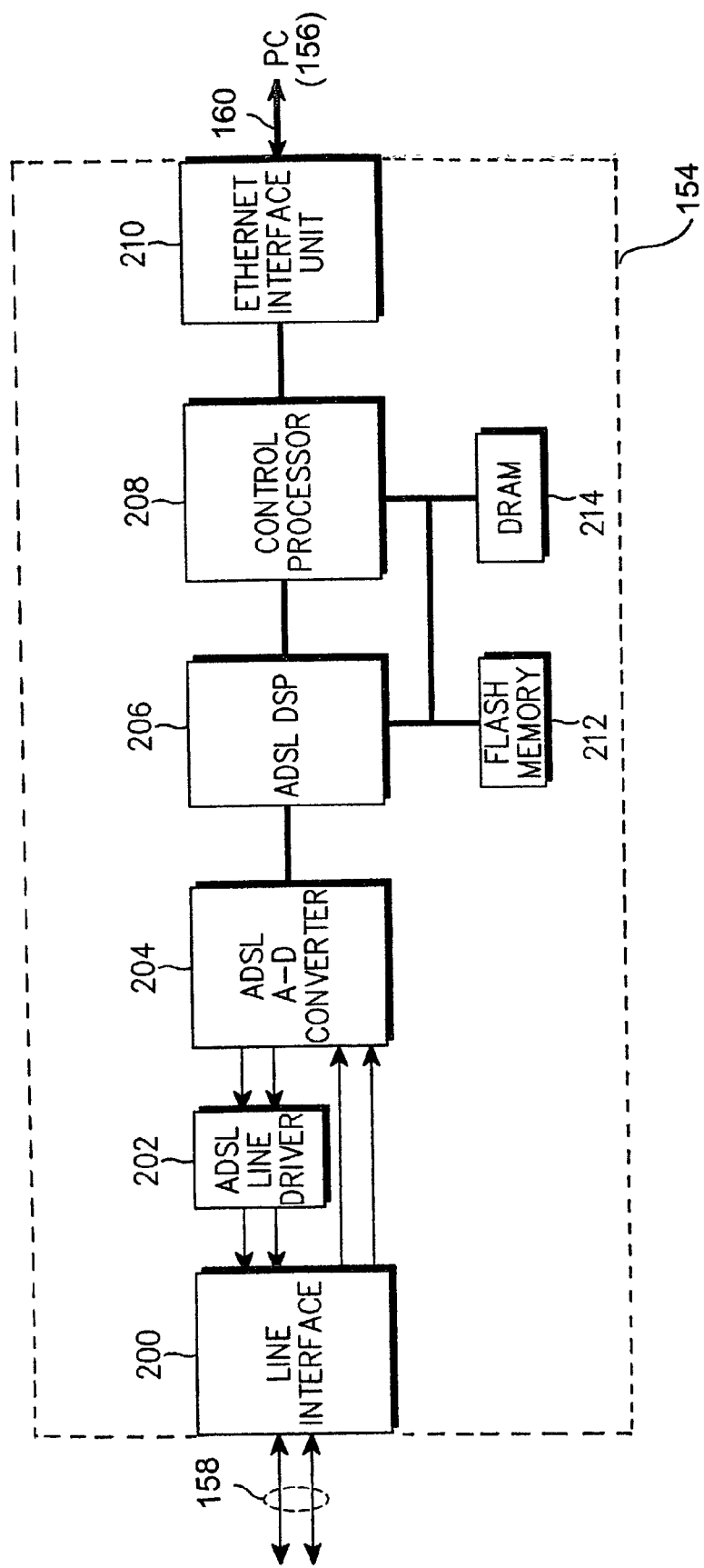
FIG. 3 is a block diagram showing a general ADSL Transceiver Unit-Remote (i.e., "ATU-R") in accordance with the present invention.

FIG. 3 is a block diagram illustrating a general type of ADSL Transceiver Unit-Remote (ATU-R) 154 according to the present invention, as shown in FIG. 2. Referring to FIG. 3, a line interface unit 200 receives an analog signal from the ADSL 158 and outputs the signal to an ADSL Analog-Digital converter (i.e., "ADSL A-D converter") 204. The ADSL A-D converter 204 can perform both analog to digital (i.e., "A/D") conversion and digital to analog (i.e., "D/A") conversion. The analog signal inputted to the ADSL A-D converter 204 is then transmitted to the ADSL 158 through an ADSL line driver 202. The ADSL A-D converter 204 also converts the analog signal inputted from a line interface unit 200 to a digital signal, and outputs the digital signal to an ADSL Digital Signal Processor (i.e., "DSP") 206. The digital signal inputted in the ADSL DSP 206 is again converted to an analog signal through the ADSL A-D converter 204 and is outputted to the ADSL line driver 202. Meanwhile, the ADSL DSP 206, being connected to a control processor 208, a flash memory 212, and Dynamic Random Access Memory (DRAM) 208, performs a processing operation of a Digital Subscriber Line signal of the ATU-R 154. Here, the control processor 208, being connected to the ADSL DSP 206, the flash memory 212, the DRAM 214, and an Ethernet Interface unit 210, functions as a main controller. The Ethernet interface unit 210, as an Ethernet link 110, is connected to a personal computer (i.e., PC) 156. Next, the flash memory 212 saves an operation program of the control processor 208 and other kinds of reference data. Finally, the DRAM 214 temporarily saves the data on the operations of the DSL DSP 206 and the control processor 208.

Figure 4:
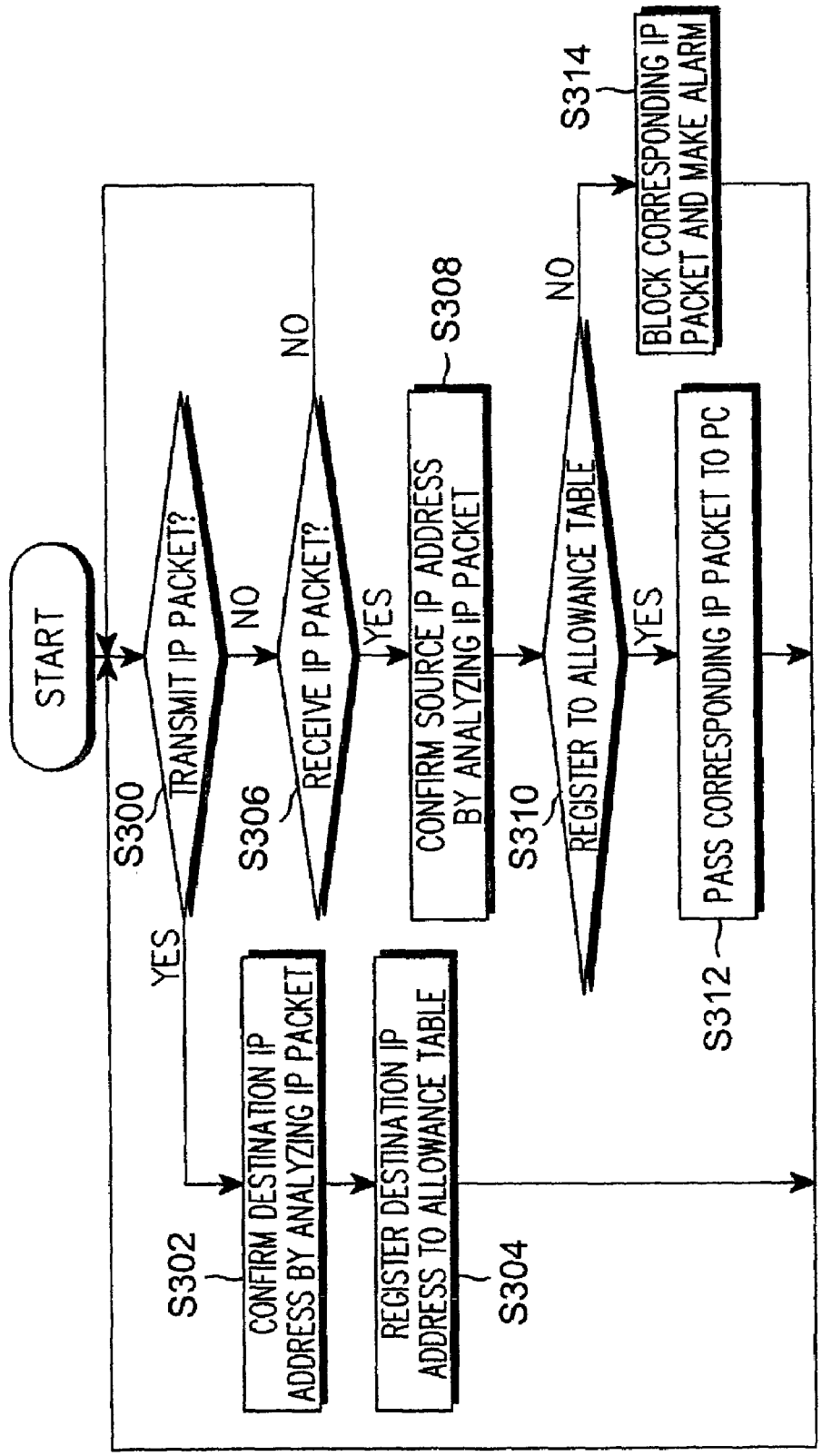
FIG. 4 is a flow chart showing different steps of a method for filtering an Internet Protocol (i.e., "IP") packet in accordance with a preferred embodiment of the present invention.

FIG. 4 is a flow chart illustrating an operational procedure of the present invention, dividing the IP packet filtering process at the control processor 208 into the steps from S300 through S314. First of all, as a PC 156 user accesses to an Internet through the ADSL 158 and transmits the IP packet to the other party, the control processor 208 responds (S300) to the request, and confirms a destination IP address by analyzing the IP packet to be transmitted to the other party from the PC 156, that is to say, the IP packet received through the Ethernet link 160 (S302). Here, as for the ATU-R 154 system, it is always possible to detect the other party's IP address, in other words, the destination IP address because the PC 156 user is the one who first requests a communication to the other party, given the Internet access of the PC 156. Therefore, the confirmed or identified destination IP address is registered to an allowance table like Table 1 shown below (S304), and later, it is subjected to the typical IP packet transmission process, and the step S300 starts again. The allowance table is prepared for referring to the IP address, especially for the case that the IP packet is received through the ADSL 158, and that the only IP packet received from the other party whom the PC 156 user wanted a communication, or Uniform Resource Locator (i.e., "URL"), should be permitted to pass through the PC 156. The allowance table is generally saved in the DRAM 214.

TABLE 1

| No | IP Address |
|---|---|
| 1 | IP Address 1 |
| 2 | IP Address 2 |
| . | . |
| . | . |
| . | . |

Afterwards, when the IP packet is received through the ADSL 158, the response is made (S306), and the source IP address of the received IP packet is detected (S308), and the source IP address is checked whether it has been registered to the allowance table shown as above (S310). If the source IP address has been already registered to the allowance table, the corresponding IP packet undergoes the typical IP packet receiving process, and is passed to the PC 156 through the Ethernet link 160 (S312), and then the step S300 starts again.

On the contrary, if the source IP address has not been registered to the allowance table, the corresponding IP packet is blocked and not passed to the PC 156 (S314), and then the step S300 starts again. Such a result is immediately informed to the PC 156 user by making an alarm. In a way of making the alarm, a light-emitting diode (LED) in the ATU-R 104 can be blinked, or a console message can be displayed on the PC's monitor or sent to the user's E-mail (electronic-mail).

Therefore, unlike the routed mode that analyzes and processes the entire IP packet, the ATU-R run in the bridge mode can carry out the IP packet filtering process simply by confirming the IP address of the IP packet, which consequently prevents any external intrusion without affecting the overall performance of the bridge mode.

In the meantime, the IP packet to be transmitted to the other party as the PC 156 user accesses to the Internet through the ADSL 158 is included to the Ethernet packet like the one shown in FIG. 5, and is later sent out to the ATU-R 104 from the PC 156 through the Ethernet link 160. The Ethernet packet is usually divided into two types, where one is a Point-to-Point Protocol over Ethernet (i.e., "PPPoE") session stage packet, and the other is an IP packet. Depending on the Ethernet packet type, the starting position of the IP packet from the Ethernet header varies. Thus, a different destination IP address should be detected for different positions of the Ethernet depending on the type of the Ethernet packet.

Figure 5:
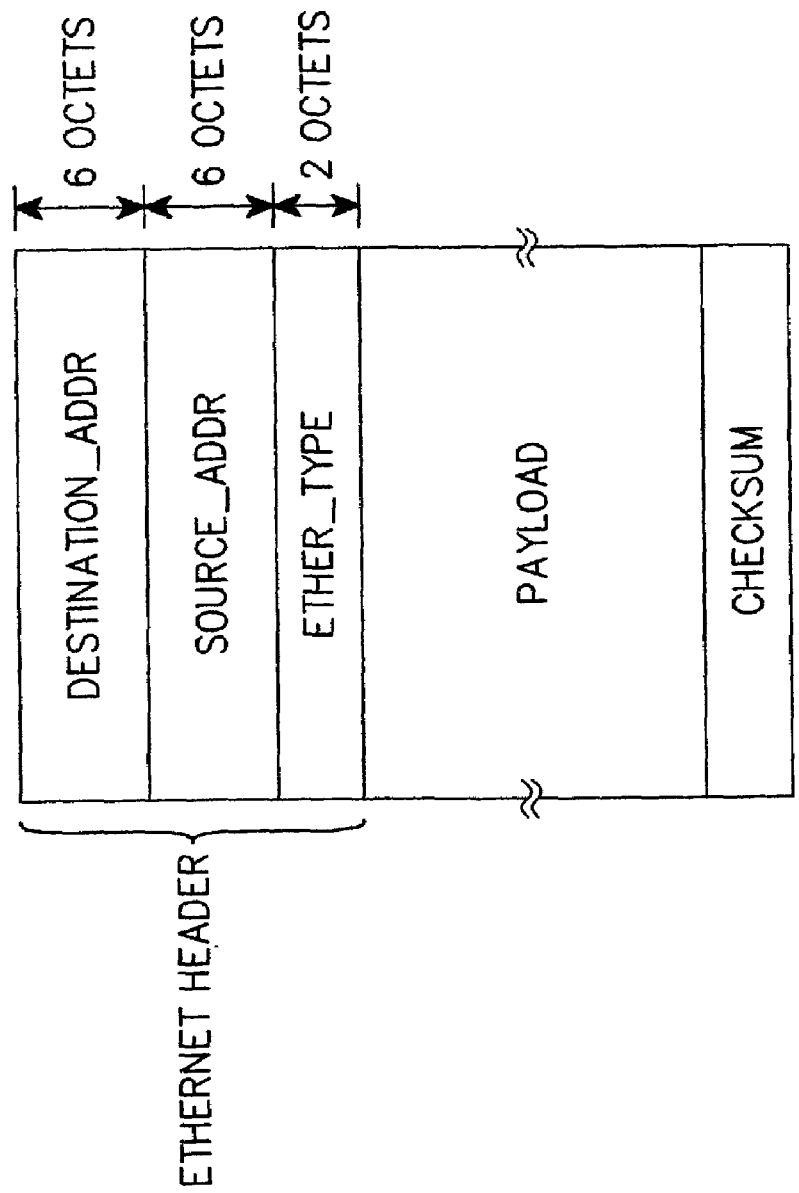
FIG. 5 diagrammatically shows an Ethernet frame format in accordance with Request for Comments (i.e., "RFC") 2516.

FIG. 5 particularly shows an Ethernet frame format diagram in accordance with Request for Comments (i.e., "RFC") 2516 among the RFC, the document regarding all kinds of sizes associated with the Internet. In general, the Ethernet frame format includes an Ethernet header composed of 6 octets destination address, DESTINATION_ADDR, 6 octets source address, SOURCE_ADDER, and 2 octets Ethernet packet type, ETHER-TYPE; a payload that follows the Ethernet header; and a checksum. Such Ethernet packet, as aforementioned, is divided into the PPPoE session stage packet and the IP packet. Here, if the ETHER_TYPE value happens to be Ox8864, the Ethernet packet type belongs to the PPPoE session stage packet, and if the ETHER_TYPE value happens to be Ox8800, the Ethernet packet type belongs to the IP packet.

Figure 6:
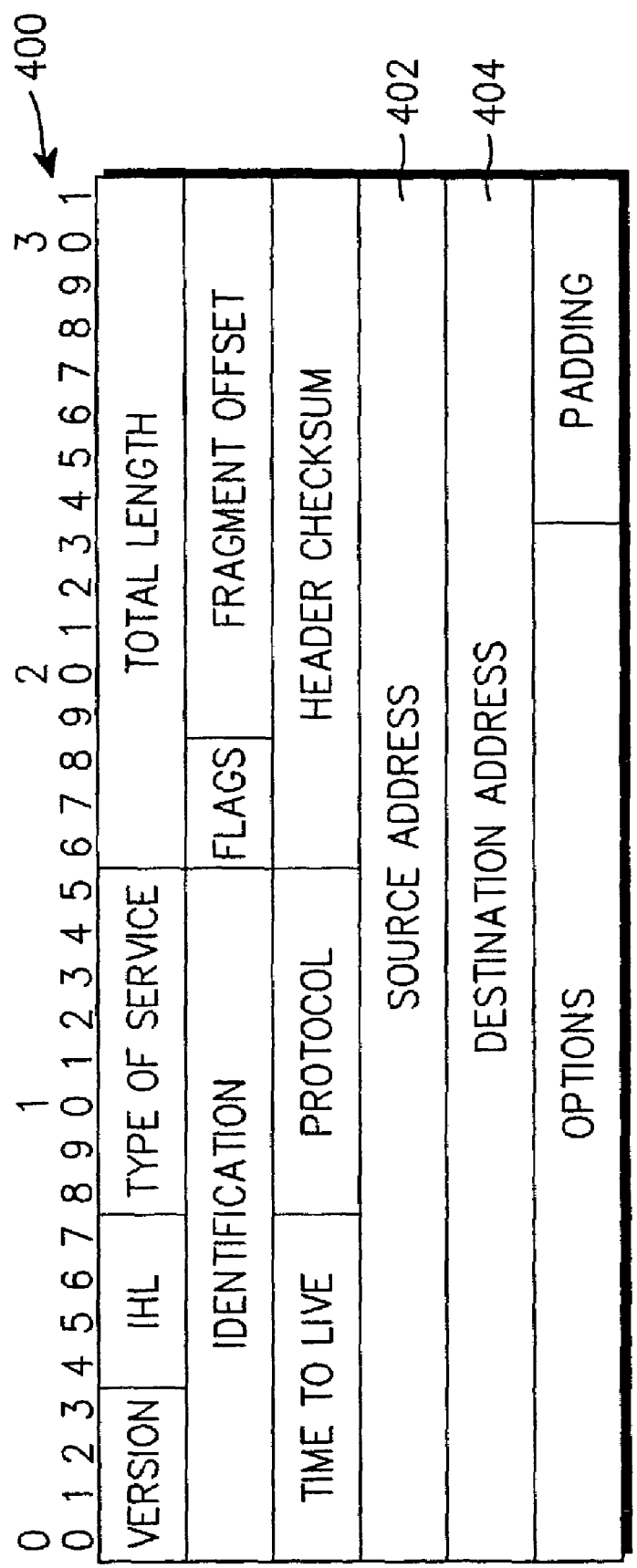
FIG. 6 diagrammatically shows an IP header format in accordance with RFC 791.

In case that the Ethernet packet type is of the IP packet, an IP header with a RFC 791 format shown in FIG. 6 follows immediately after the Ethernet header of FIG. 5. In this way, the destination IP address 404 is detected from the IP header illustrated in FIG. 6, which comes right after the Ethernet header. The numbers from 00 through 31 under the reference numeral 400 in FIG. 6 indicate bits starting from 0 through 31.

Figure 7:
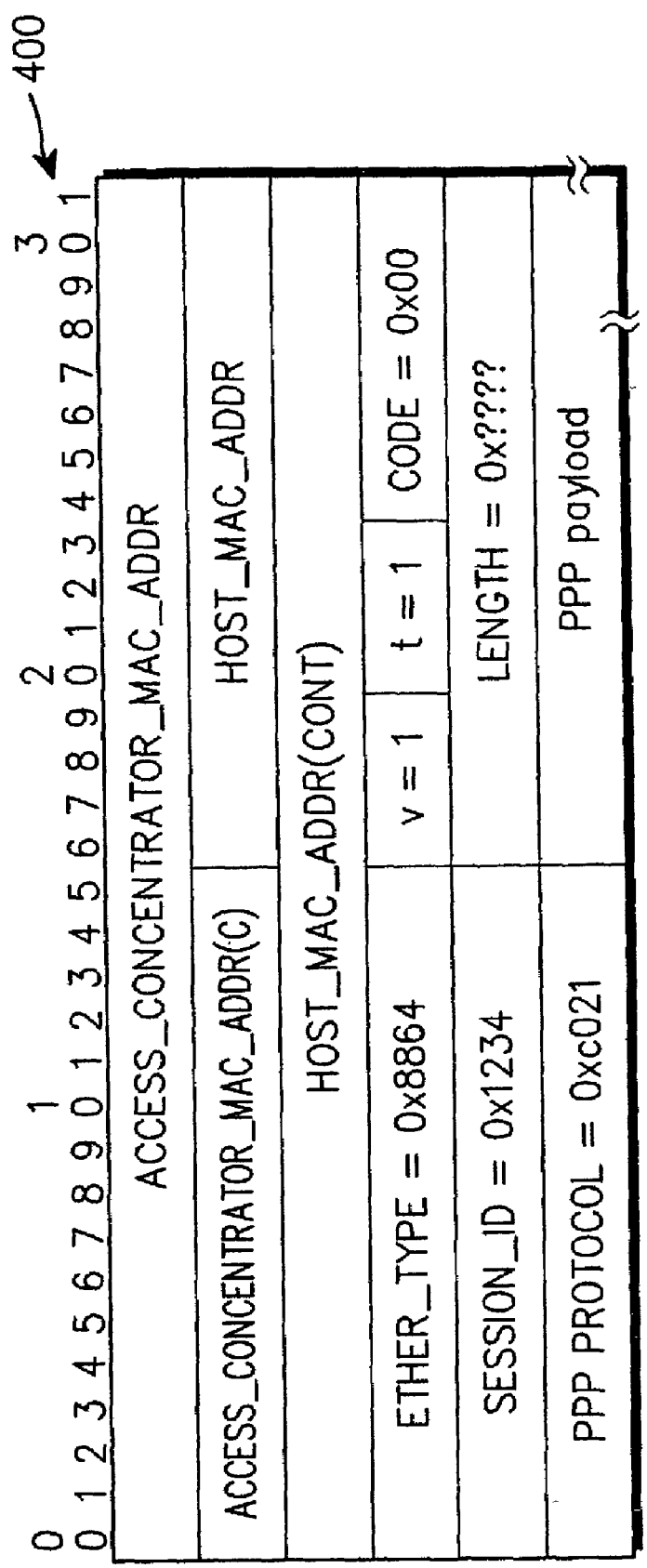
FIG. 7 diagrammatically shows a packet format in accordance with RFC 2516.

In contrast, if the Ethernet packet type turns out to be the PPPoE session stage packet, an IP header like the one illustrated in FIG. 6 soon follows from the next position that is away from the length field, LENGTH, on the RFC 2516 format as far as Ox??? Value. Here, the Ethernet header shown in FIG. 7 occupies as much as ETHER_TYPE=OX8864, which is quite identical with the Ethernet header shown in FIG. 5. That is to say, the next IP header follows after a certain predetermined offset as much as the sum of the 6 octets, the length of fields, i.e., v, t, CODE, SESSION_ID from the Ethernet header, and the value of Ox???, the length field LENGTH. Therefore, if the Ethernet packet type is of the PPPoE session stage packet, the destination IP address 404 can be detected from the IP header shown in FIG. 6 that comes from the Ethernet header after the predetermined offset.

In addition, detecting the source IP address from the IP packet received through the ADSL 158 can be accomplished by detecting the source IP address 402 from the IP header like the one shown in FIG. 6 of the IP packet received.

So far, although the preferred embodiment of the present invention has been explained, any modification within the scope of the invention can be carried out. Especially, the present invention introduced the method of blocking the IP packet and making an alarm in case that the IP packet that has not been registered to the allowance table is received, but one might decide to exclude the method. Moreover, according to the present invention, the IP packet filtering is performed only if the user wants, and the user can selectively designate the filtering process itself. To this end, the user, through the PC 156, could decide or select whether he wants to perform the IP packet filtering, or he could install a dip switch in the ATU-R 154 for selecting the IP packet filtering process, if necessary. Even though the ADSL has been employed as an exemplary of the xDSL, the same can be applied to the IP packet filtering in the bridge mode as well upon the necessity.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A method for filtering an Internet protocol packet in customer premise equipment connected between a personal computer and a digital subscriber line, being operated in a bridge mode, the method comprising the steps of:
   detecting a destination Internet protocol address by analyzing the Internet protocol packet to be transmitted to another party as a user of said personal computer accesses to an Internet through said digital subscriber line;
   registering said destination Internet protocol address to a predetermined allowance table;
   detecting a source Internet protocol address of the Internet protocol packet upon receiving the Internet protocol packet through said digital subscriber line; and
   checking whether said source Internet protocol address is duly registered to the allowance table for passing the corresponding Internet protocol packet through said personal computer only when said source Internet protocol address has been registered, and for blocking the corresponding Internet protocol packet when said source Internet protocol address has not been registered,
   said step of detecting said destination Internet protocol address further comprising the steps of:
      checking an Ethernet packet type upon receiving the Ethernet packet through an Ethernet link connected to said personal computer, the Ethernet packet including said Internet protocol packet to be transmitted to the other party as the personal computer user access to the Internet through the digital subscriber line; and
      detecting said destination Internet protocol address from an Internet protocol header that follows an Ethernet header after a predetermined offset when the Ethernet packet type is a Point-to-Point Protocol over Ethernet session stage.

2. The method of claim 1, said step of detecting said destination Internet protocol address further comprising the step of:
   detecting said destination Internet protocol address from an Internet protocol header that comes right after the Ethernet header without the predetermined offset, in case that the Ethernet packet type is an Internet protocol packet.

3. The method of claim 1, further comprising a step of actuating an alarm, when said source Internet protocol address is not registered to said allowance table.

4. The method of claim 1, said method being valid only when said user of said personal computer designates the Internet protocol packet filtering.

5. The method of claim 1, said digital subscriber line being a member selected from a group consisting of Asymmetric Digital Subscriber Line, High-bit-rate Digital Subscriber Line, Single-line Digital Subscriber Line, Single- Pair High_Speed Digital Subscriber Line, Universal Digital Subscriber Line, and Very-high-data-rate Digital Subscriber Line.

6. A method for filtering an Internet protocol packet in customer premise equipment connected between a personal computer and a digital subscriber line, being operated in a bridge mode, the method comprising the steps of:
   detecting a destination Internet protocol address by analyzing the Internet protocol packet to be transmitted to another party as a user of said personal computer accesses to an Internet through said digital subscriber line;
   registering said destination Internet protocol address to a predetermined allowance table;
   detecting a source Internet protocol address of the Internet protocol packet upon receiving the Internet protocol packet through said digital subscriber line; and
   checking whether said source Internet protocol address is duly registered to the allowance table for passing the corresponding Internet protocol packet through said personal computer only when said source Internet protocol address has been registered, and for blocking the corresponding Internet protocol packet when said source Internet protocol address has not been registered,
   said step of detecting said destination Internet protocol address further comprising the steps of:
   checking an Ethernet packet type upon receiving the Ethernet packet through an Ethernet link connected to said personal computer, the Ethernet packet including said Internet protocol packet to be transmitted to the other party as said personal computer user access to the Internet through the digital subscriber line; and
   detecting said destination Internet protocol address from an Internet protocol header that comes right after the Ethernet header without the predetermined offset when the Ethernet packet type is an Internet protocol packet.

7. A method, comprising:
   detecting a destination network address by analyzing a network packet to be transmitted to another party as a user of a computer accesses to an Internet through a connection line;
   registering said destination address to a predetermined allowance table;
   detecting a source network address of a received network packet through said connection line; and
   checking whether said source network address is registered to the allowance table for passing the corresponding network protocol packet through said computer only when said source network address has been registered, and for blocking the corresponding network packet when said source network address has not been registered,
   said step of detecting said destination network address further comprising the steps of:
   checking an Ethernet packet type upon receiving the Ethernet packet through an Ethernet link connected to said personal computer, the Ethernet packet including said network protocol packet to be transmitted to the other party as said personal computer user access to the network through the digital subscriber line; and
   detecting said destination network protocol address from a network protocol header that comes right after the Ethernet header without the predetermined offset, in case that the Ethernet packet type is a network protocol packet.

8. The method of claim 7, with said connection line being a digital subscriber line.

9. The method of claim 8, with said network address being an Internet protocol address and the network packet being an Internet protocol packet.

10. The method of claim 8, said step of detecting said destination network address further comprising the steps of:
    detecting said destination network protocol address from a network protocol header that follows an Ethernet header after a predetermined offset, in case that the Ethernet packet type is a Point-to-Point Protocol over Ethernet session stage.

11. The method of claim 10, further comprising a step of actuating an alarm, when said source network protocol address is not registered to said allowance table.

12. A method, comprising:
    detecting a destination Internet protocol address by checking an Internet protocol packet to be transmitted to another party as a user of a personal computer accesses to an Internet through a digital subscriber line;
    registering said destination Internet protocol address to a predetermined allowance table;
    detecting a source Internet protocol address of a received Internet protocol packet from said digital subscriber line; and
    checking whether said source Internet protocol address has been registered to said predetermined allowance table,
    said step of detecting said destination Internet protocol address further comprising the steps of:
    checking an Ethernet racket type upon receiving the Ethernet packet through an Ethernet link connected to said personal computer, the Ethernet packet including said Internet protocol packet to be transmitted to the other party as said personal computer user access to the Internet through the digital subscriber line; and
    detecting said destination Internet protocol address from an Internet protocol header that follows an Ethernet header after a predetermined offset, in case that the Ethernet packet type is a Point-to-Point protocol over Ethernet session stage.

13. The method of claim 12, further comprising of informing said user when said source Internet protocol address has not been registered to said predetermined allowance table.

14. The method of claim 12, further comprising of actuating an alarm when said source Internet protocol address has not been registered to said predetermined allowance table.

15. The method of claim 12, further comprising of passing the received Internet protocol packet corresponding to said source Internet protocol address when said source Internet protocol address is registered to said predetermined allowance table.

16. The method of claim 15, further comprising of actuating an alarm when said source Internet protocol address has not been registered to said predetermined allowance table.

17. The method of claim 12, further comprising of blocking the received Internet protocol packet corresponding to said source Internet protocol address when said source Internet protocol address is not registered to said predetermined allowance table.

18. The method of claim 12, said method being valid only when said user of said personal computer designates a filtering of the Internet protocol packet.

19. The method of claim 12, said step of detecting said destination Internet protocol address further comprising the step of:

detecting said destination Internet protocol address from an Internet protocol header that comes right after the Ethernet header without the predetermined offset, in case that the Ethernet packet type is an Internet protocol packet.

20. An apparatus, comprising:

a computer accessing information from a network, said computer transmitting an Internet protocol packet to another party; and a first unit interfacing said computer with said network through a digital subscriber line, said first unit comprising a controller and a memory, said controller confirming a destination Internet protocol address from the Internet protocol packet and registering said destination Internet protocol address in an allowance table in said memory, said controller detecting a source Internet protocol address of a received Internet protocol packet from said digital subscriber line, said controller determining whether said source Internet protocol address from the received Internet protocol packet through said digital subscriber line is registered to said allowance table in said memory, said controller blocking the corresponding Internet protocol packet received through said digital subscriber line from being transmitted to said computer when said source Internet protocol address of the received Internet protocol packet is not registered on said allowance table in said memory, and said controller passing to said computer the received Internet protocol packet corresponding to said source Internet protocol address when said source Internet protocol address is registered on said allowance table, said controller determining said destination Internet protocol address according to the acts comprising of:

checking an Ethernet packet type upon receiving the Ethernet packet through an Ethernet link connected to said personal computer, the Ethernet packet including said Internet protocol packet to be transmitted to the other party as said personal computer user access to the Internet through the digital subscriber line; and detecting said destination Internet protocol address from an Internet protocol header that comes right after the Ethernet header without the predetermined offset, in case that the Ethernet packet type is an Internet protocol packet.

21. The apparatus of claim 20, further comprising an alarm being actuated when said controller determines the Internet protocol address of said source Internet protocol packet is not registered on said allowance table in said memory.

22. The apparatus of claim 20, said first unit registering, determining, and detecting the Internet protocol address and blocking or passing the received Internet protocol packet when a filtering of the Internet protocol packets is selected by a user on said computer.

23. The apparatus of claim 20, said network being the Internet and said computer being connected to said first unit by an Ethernet line.

24. The apparatus of claim 20, said digital subscriber line being a member selected from a group consisting of Asymmetric Digital Subscriber Line, High-bit-rate Digital Subscriber Line, Single-line Digital Subscriber Line, Single-Pair High_Speed Digital Subscriber Line, Universal Digital Subscriber Line, and Very-high-data-rate Digital Subscriber Line.

25. The apparatus of claim 20, said controller determining said destination Internet protocol address according to the act further comprising of:

detecting said destination Internet protocol address from an Internet protocol header that follows an Ethernet header after a predetermined offset, in case that the Ethernet packet type is a Point-to-Point Protocol over Ethernet session stage.

26. A method, comprising:

detecting a destination network address by analyzing a network packet to be transmitted to another party as a user of a computer accesses to an Internet through a connection line;

registering said destination address to a predetermined allowance table;

detecting a source network address of a received network packet through said connection line; and checking whether said source network address is registered to the allowance table for passing the corresponding network protocol packet through said computer only when said source network address has been registered, and for blocking the corresponding network packet when said source network address has not been registered, said step of detecting said destination network address further comprising the steps of:

checking an Ethernet packet type upon receiving the Ethernet packet through an Ethernet link connected to said personal computer, the Ethernet packet including said network protocol packet to be transmitted to the other party as said personal computer user access to the network through the digital subscriber line; and detecting said destination network protocol address from a network protocol header that follows an Ethernet header after a predetermined offset, in case that the Ethernet packet type is a Point-to-Point Protocol over Ethernet session stage.

27. A method, comprising:

detecting a destination Internet protocol address by checking an Internet protocol packet to be transmitted to another party as a user of a personal computer accesses to an Internet through a digital subscriber line;

registering said destination Internet protocol address to a predetermined allowance table;

detecting a source Internet protocol address of a received Internet protocol packet from said digital subscriber line; and checking whether said source Internet protocol address has been registered to said predetermined allowance table, said step of detecting said destination Internet protocol address further comprising the steps of:

checking an Ethernet packet type upon receiving the Ethernet packet through an Ethernet link connected to said personal computer, the Ethernet packet including said Internet protocol packet to be transmitted to the other party as said personal computer user access to the Internet through the digital subscriber line; and detecting said destination Internet protocol address from an Internet protocol header that comes right after the Ethernet header without the predetermined offset, in case that the Ethernet packet type is an Internet protocol packet.

28. An apparatus, comprising:

a computer accessing information from a network, said computer transmitting an Internet protocol packet to another party; and a first unit interfacing said computer with said network through a digital subscriber line, said first unit comprising a controller and a memory, said controller confirming a destination Internet protocol address from the Internet protocol packet and registering said destination Internet protocol address in an allowance table in said memory, said controller detecting a source Internet protocol address of a received Internet protocol packet from said digital subscriber line, said controller determining whether said source Internet protocol address from the received Internet protocol packet through said digital subscriber line is registered to said allowance table in said memory, said controller blocking the corresponding Internet protocol packet received through said digital subscriber line from being transmitted to said computer when said source Internet protocol address of the received Internet protocol packet is not registered on said allowance table in said memory, and said controller passing to said computer the received Internet protocol packet corresponding to said source Internet protocol address when said source Internet protocol address is registered on said allowance table, said controller determining said destination Internet protocol address according to the acts comprising of:

checking an Ethernet packet type upon receiving the Ethernet packet through an Ethernet link connected to said personal computer, the Ethernet packet including said Internet protocol packet to be transmitted to the other party as said personal computer user access to the Internet through the digital subscriber line; and detecting said destination Internet protocol address from an Internet protocol header that follows an Ethernet header after a predetermined offset, in case that the Ethernet packet type is a Point-to-Point Protocol over Ethernet session stage.

* * * * *